United States Patent [19]
Ohi et al.

[11] Patent Number: 5,654,869
[45] Date of Patent: Aug. 5, 1997

[54] CHIP-FORMED SOLID ELECTROLYTIC CAPACITOR WITHOUT AN ANODE LEAD PROJECTING FROM ANODE MEMBER

[75] Inventors: Masashi Ohi; Hiromichi Taniguchi; Atushi Kobayashi, all of Tokyo, Japan

[73] Assignee: NEC Corporation, Tokyo, Japan

[21] Appl. No.: 569,304

[22] Filed: Dec. 8, 1995

[30]   Foreign Application Priority Data

Dec. 12, 1994   [JP]   Japan ..................... 6-307547

[51] Int. Cl.⁶ ............................. H01G 9/00; H01G 9/02
[52] U.S. Cl. .................... 361/540; 361/524; 361/525
[58] Field of Search ........................... 361/523, 524–525, 361/528–529, 532–536, 537–540; 29/25.03

[56]                    References Cited

U.S. PATENT DOCUMENTS

| | | | |
|---|---|---|---|
| 5,036,434 | 7/1991 | Kobayashi | 361/540 |
| 5,349,496 | 9/1994 | Taniguchi et al. | 361/528 |
| 5,390,074 | 2/1995 | Hasegawa et al. | 361/540 |

FOREIGN PATENT DOCUMENTS

| | | |
|---|---|---|
| 61-31609 | 7/1986 | Japan . |
| 2-137025 | 11/1990 | Japan . |
| 3-97212 | 4/1991 | Japan . |
| 4-99011 | 3/1992 | Japan . |
| 6-69082 | 3/1994 | Japan . |

*Primary Examiner*—Bot L. Ledynh
*Attorney, Agent, or Firm*—Young & Thompson

[57]                  ABSTRACT

A chip-formed solid electrolytic capacitor having a structure wherein a projecting anode lead is not provided for an anode member. The solid electrolytic capacitor is fabricated by the following manner: First, an electrically insulating resin such as a fluororesin is impregnated into an end face of a porous electrode member to form an insulating resin impregnated portion, and an electrode lead member is bonded to the anode member at the insulating resin impregnated portion. An anodic oxidation film, a solid electrolyte layer and a cathode layer successively are formed on the anode member. Then, an electrically insulating outer package is applied so that the cathode layer on a face of the anode member opposing to the face on which the electrode lead member is mounted is exposed. After removing the electrode lead member, an anode outer electrode layer is formed on the insulating resin impregnated portion, and a cathode outer electrode layer which electrically connects to the cathode layer is formed on the end face of the anode member opposing to the anode outer electrode layer.

9 Claims, 2 Drawing Sheets

CHIP-FORMED SOLID ELECTROLYTIC CAPACITOR WITHOUT AN ANODE LEAD PROJECTING FROM ANODE MEMBER

BACKGROUND OF THE INVENTION

1. Field of the Invention

The present invention relates to a chip-formed solid electrolytic capacitor having a structure wherein a projecting anode lead is not provided for an anode member and a method of producing the chip-formed solid electrolytic capacitor.

2. Description of the Prior Art

In recent years, miniaturization and increase in number of functions of electronic apparatus have progressed remarkably, and as a result of the progress, electronic parts which allow high density mounting are now demanded. Also solid electrolytic capacitors are demanded to allow high density mounting, and principally, chip-formed capacitors of the resin molded type for surface mounting are used as such. Referring to FIG. 1, a chip-formed capacitor of the resin molded type includes a capacitor element 13 on which an anode lead 14 is implanted uprightly. A cathode lead terminal 16 is mounted on the capacitor element 13 by a conductive bonding agent 15, and an anode lead terminal 17 is bonded to the anode lead 14. The end sides of the cathode lead terminal 16 and the anode lead terminal 17 are exposed to the outside along the outer face of a resin molding member 18 for outer packaging. In the chip-formed capacitor of the resin molded type, however, since the lead terminals 16 and 17 for the cathode and the anode must be mounted and led out to the outer face of the resin molding element 18, the proportion of the capacitor element 13 to the entire volume of the chip-formed capacitor cannot be made very high. Consequently, the chip-formed capacitor of the resin molded type is unsatisfactory for high density mounting and is complicated in the process of fabrication. Thus, chip-formed solid electrolytic capacitors of the construction in which no resin molding member is used are developed energetically as disclosed, for example, in Japanese Patent Publication No. Sho-61-31609 (JP, B2, 61-31609) by K. Mitsui.

FIG. 2 is a side elevational sectional view showing the construction of a chip-formed Solid electrolytic capacitor which does not employ a resin molding member. A chip-formed capacitor of the type mentioned is formed in the following manner. In particular, an anodic oxidation film or coat 22, a solid electrolyte layer 23 and a cathode layer 24 are successively formed on the surface of an anode member 21 on which an anode lead 29 is implanted uprightly. Then, a resin layer 28 for outer packaging is formed on the entire outer peripheral face of the anode member 21 except a face which opposes the face at which the anode lead 29 is led out. Thereafter, a metal catalyzer is applied to the face of the anode member 21 at which the anode lead 29 is led out and the opposed face to form a pair of plated layers 25a and 25b made of nickel or some other suitable material. Further, solder layers are deposited on the plated layers 25a and 25b to form a cathode outer electrode layer 26 and an anode outer electrode layer 27, respectively. Finally, the anode lead 29 is cut. A valve metal such as aluminum or tantalum is used for the anode member 21.

With the conventional chip-formed capacitor, in order to increase the electrostatic capacitance value per volume, the projection amount of the anode lead remaining after cutting must be reduced while maintaining the reliability in connection between the anode lead and the anode outer electrode layer. Japanese Utility Model Laid-Open Application No. Hei-2-137025 (JP, U, 2-137025) by H. Oka discloses a technique wherein the projection amount of an anode lead can be made very small by connecting a cut face of the anode lead and an anode external electrode layer to each other by way of a plated layer. With the method of Oka, since electric connection is established at the cut face of the anode lead, special attention must be paid to maintenance of the reliability in connection. Japanese Patent Laid-Open Application No. Hei-3-97212 (JP, A, 3-97212) by Y. Saiki discloses another technique wherein a plated catalyzer metal layer, a plated layer and a solder layer are successively formed to form an external anode layer and the external anode layer and an anode lead are connected to each other by a metal-to-metal junction to achieve improvement in close contactness and good matching in coefficient of thermal expansion between the anode lead and the external anode layer to assure improved reliability in connection. Further, Japanese Patent Laid-Open Application No. Hei-4-99011 (JP, A, 4-99011) by Y. Saiki discloses a further technique wherein an alloy layer is interposed between an anode lead and an anode outer electrode layer to achieve improvement in reliability in connection.

In the conventional chip-formed solid electrolytic capacitors described above, while an anode lead projects from an anode member and a cut face of the anode lead or a face of the anode lead from which an oxide coating has been removed is connected to an anode outer electrode layer, in order to assure a high degree of reliability in connection, the anode lead must project by a length greater than a fixed length. This is a disadvantage of the conventional chip-formed solid electrolytic capacitors from the point of view of miniaturization and/or improvement in volume efficiency.

SUMMARY OF THE INVENTION

It is an object of the present invention to provide a chip-formed solid electrolytic capacitor which is improved in volume efficiency by eliminating the necessity for an anode lead to project and is superior in reliability in connection.

It is another object of the present invention to provide a method of fabricating the chip-formed solid electrolytic capacitor which does not have an anode lead projecting from an anode member.

According to the present invention, a solid electrolytic capacitor in the form of a chip comprises a porous anode member made of a valve metal, an oxide film layer formed on the anode member, a cathode layer formed from a conductive material, a solid electrolyte layer held between the oxide film layer and the cathode layer, an anode outer electrode layer disposed on one of a pair of end faces of the anode member, a cathode outer electrode layer disposed on the other end face of the electrode member and electrically connected to the cathode layer, and an outer packaging resin layer for covering over a region in which the anode outer electrode layer and the cathode outer electrode layer are not formed to isolate both outer electrode layers from each other, the one of the end faces of the anode member having an insulating resin impregnated portion where an electrically insulating resin is impregnated in the anode member, the anode member and the anode outer electrode layer being electrically connected to each other at the insulating resin impregnated portion.

In the solid electrolytic capacitor in the form of a chip of the present invention, a water repellent resin is preferably used for the electrically insulating resin. As a resin preferably used for impregnation into the anode member, for example, a fluororesin, a silicone resin or an epoxy resin can be used.

As a valve metal, any metal from which a close oxide film can be formed by anodic oxidation such as aluminum (Al), tantalum (Ta), niobium (Nb) or zirconium (Zr) can be used. Above all, tantalum is preferably used. Further, as a material to be used for the solid electrolyte layer, an inorganic solid electrolyte such as manganese dioxide or an organic solid electrolyte made of a conductive polymer material can be used. The conductive polymer material may be polypyrrole, polyaniline, polythiophene or the like.

For the anode outer electrode layer or the cathode outer electrode layer, for example, a solder layer can be used, and preferably the anode outer electrode layer and the anode member are bonded to each other by way of a plated layer. Similarly, also the cathode outer electrode layer and the cathode layer can be bonded to each other by way of a plated layer. For the cathode layer, for example, graphite or the like can be used.

In the chip-formed solid electrolytic capacitor of the present invention, an insulating resin impregnated portion is provided at a portion of the anode member, and the anode member and the anode outer electrode layer are electrically connected to each other at the insulating resin impregnated portion. Consequently, the necessity to implant an anode lead on the anode member and to connect the anode member and the anode outer electrode layer to each other is eliminated, and the volume efficiency is improved corresponding to an amount by which an anode lead need not project. Further, since the insulating resin impregnated portion and the anode outer electrode layer can be bonded to each other, for example, by way of a plated layer, the bonding area for the electric connection between them can be made greater than the area of a cut face of an anode lead of a conventional electrolytic capacitor. Consequently, also the reliability in connection is improved.

According to the present invention, a method of producing a solid electrolytic capacitor in the form of a chip comprises the steps of impregnating an electrically insulating resin into an end face of a porous electrode member made of a valve metal to form an insulating resin impregnated portion, electrically connecting an electrode lead member and the anode member to each other in a region in which the insulating resin impregnated portion is formed, forming an oxide film layer on the anode member by anodic oxidation, successively forming a solid electrolyte layer and a cathode layer on the oxide film layer, forming an electrically insulating outer package so that the cathode layer on a face of the anode member opposing to the face on which the electrode lead member is mounted is exposed, and removing the electrode lead member, forming an anode outer electrode layer on the end face of the anode member corresponding to the position from which the electrode lead member has been removed, and forming, on the end face of the anode member opposing to the anode outer electrode layer, a cathode outer electrode layer which electrically connects to the cathode layer.

In the method of producing a solid electrolytic capacitor in the form of a chip according to the present invention, since an insulating resin impregnated portion is formed at a portion of an anode member and an electrode lead member as a temporary electrode lead is bonded to the insulating resin impregnated portion, voltage can be applied to the anode member during anodic oxidation without implanting an anode lead to the anode member. After an oxide film layer, a solid electrolyte layer, a cathode layer and an electrically insulating outer package are successively formed, the electrode lead member is removed from the anode member and electric connection is established between the anode member and the anode outer electrode layer in a region from which the electrode lead member has been removed. Consequently, the completed chip-formed capacitor does not have a projection of an anode lead and has an improved volume efficiency. Further, since the area of the region from which the electrode lead member is removed can be made larger in accordance with the necessity, the reliability in connection can be improved.

As a method for bonding the electrode lead member to the anode member, for example, crimping or soldering can be adopted.

As the electrically insulating resin to be impregnated into the anode member, preferably a water repellent resin is used. By impregnating the water repellent resin into the anode member form the insulating resin impregnated portion, the insulating resin impregnated portion exhibits a water repellent property. Therefore, at the steps of formation of an oxide film layer and formation of a solid electrolyte layer which are typically performed using aqueous solution, the oxide film layer and the solid electrolyte layer, above all the solid electrolyte layer, are not formed in the region in which the insulating region impregnated portion is formed. Consequently, otherwise possible short-circuiting between the solid electrolyte layer and the anode outer electrode layer is prevented with certainty.

As a method for forming the solid electrolyte layer, for example, a method of depositing a manganese dioxide layer by thermal decomposition may be used. The solid electrolyte layer may be formed from a conductive polymer material. In this instance, after the electrode lead member is removed, preferably processing of insulating the solid electrolyte present in the proximity of the position from which the electrode lead member has been removed is performed.

The above and other objects, features and advantages of the present invention will become apparent from the following description referring to the accompanying drawings which illustrate an example of a preferred embodiment of the present invention.

DESCRIPTION OF THE PREFERRED EMBODIMENTS

<<First Embodiment>>

Figure 1:
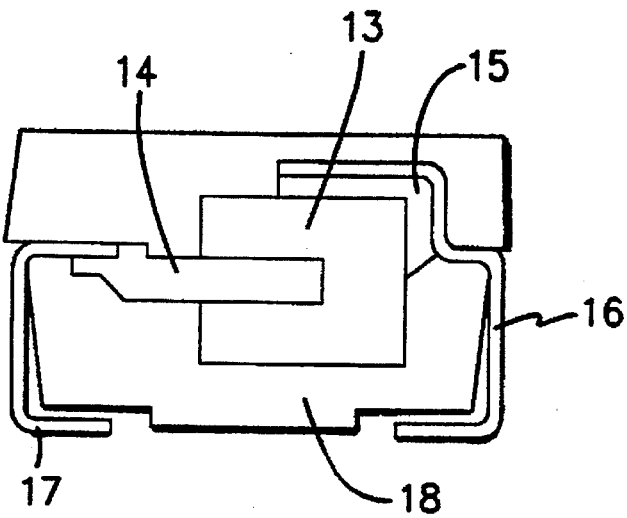
FIG. 1 is a side elevational sectional view of a conventional chip-formed solid electrolytic capacitor of the resin molded type.
Figure 2:
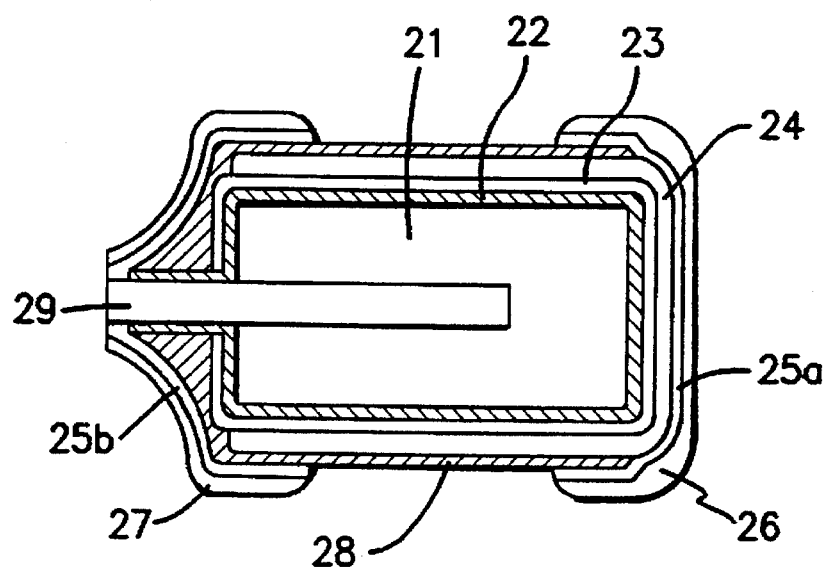
FIG. 2 is a side elevational sectional view of another conventional chips formed solid electrolytic capacitor which does not employ a resin molding member.
Figure 3:
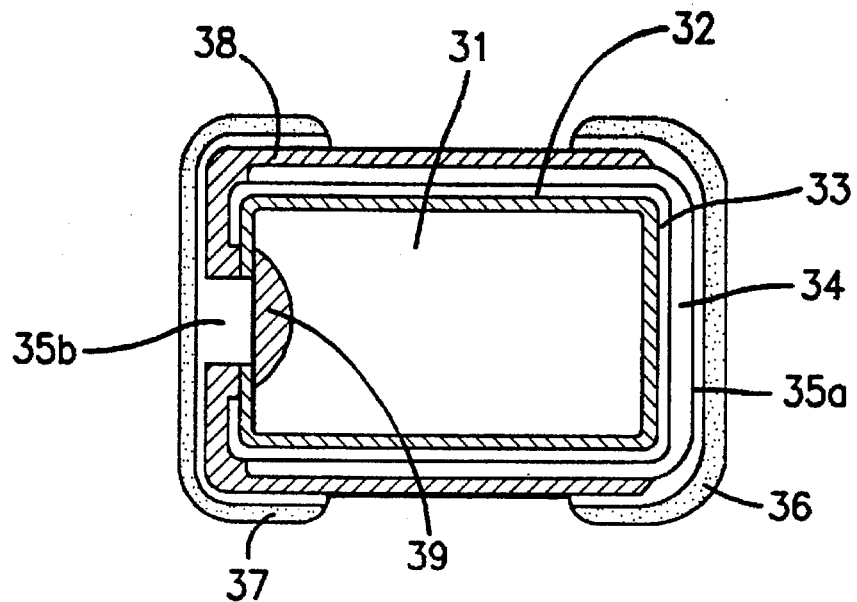
FIG. 3 is a side elevational sectional view of a chip-formed solid electrolytic capacitor according to a preferred embodiment of the present invention.

A chip-formed solid electrolytic capacitor of a first embodiment of the present invention is shown in FIG. 3. In the chip-formed solid electrolytic capacitor shown, a porous anode member 31 of a substantially parallelepiped profile obtained by sintering a valve metal such as tantalum in a high temperature vacuum condition. A pair of opposing end faces of the anode member 31 correspond to the anode side and the cathode side of the chip-formed capacitor.

A substantially central portion of the end face on the anode side of the anode member 31 is impregnated in advance with and hardened by an insulating resin to form an insulating resin impregnated portion 39. An oxide film 32 formed by anodic oxidation and a solid electrolyte layer 33 are layered in this order on the surface of the anode member 31 except the region in which the insulating resin impregnated portion 39 is formed. Except the anode side face of the anode member 31, a cathode layer 34 made of a conductive material is formed on the solid electrolyte layer 33, and except the cathode side face of the anode member 31 and the region of the anode member 31 in which the insulating resin impregnated portion 39 is formed, a layer of an outer packaging resin 38 is formed so as to cover over the solid electrolyte layer 33 and the cathode layer 34. The outer packaging resin 38 completely covers over the solid electrolyte layer 33 at the end portion of the anode member 31 on the insulating resin impregnated portion 39 side so as to prevent the solid electrolyte layer 33 from making contact with a plated layer 35b on the anode side. On the cathode side face of the anode member 31, a cathode outer electrode layer 36 in the form of a cap is formed with a plated layer 35a interposed therebetween. The cathode outer electrode layer 36 is electrically connected to the cathode layer 34. Meanwhile, on the anode side face, an anode outer electrode layer 37 in the form of a cap is formed with the plated layer 35b interposed therebetween. The plated layer 35b is bonded to the anode member 31 at the insulating resin impregnated portion 39 so that the anode member 31 and the anode outer electrode layer 37 are electrically connected to each other.

A method of fabricating the chip-formed solid electrolytic capacitor is described below.

Figures 4A, 4B, 4C:
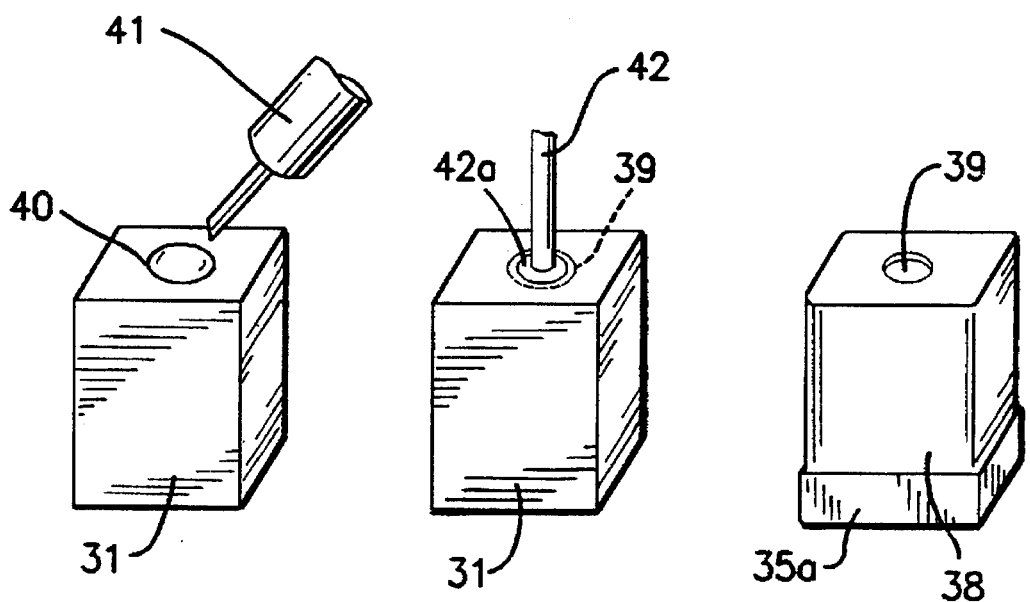
FIG. 4A is a perspective view illustrating a step of applying an insulating resin to an anode member.
FIG. 4B is a perspective view showing a lead member mounted in a region in which an insulating resin impregnated portion is formed.
FIG. 4C is a perspective view showing a condition wherein the lead member is removed after a plated layer on the cathode side is formed.

An anode member 31 is first formed by sintering powder of a valve metal, and then a liquid insulating resin 40 made of a fluororesin is dripped and applied to a face of the anode member 31 on the anode side using a resin applying machine 41 as seen in FIG. 4A. In this instance, the viscosity of the insulating resin 40 is controlled so that the insulating resin 40 may be impregnated into the inside of the anode member 31 which is in a porous condition to form an insulating resin impregnated portion 39. Then, as a temporary anode lead, a lead member 42 is bonded to the insulating resin impregnated portion 39 by crimping or soldering. In the present embodiment, the lead member 42 used has, formed at an end thereof, a small disk portion 42a which is smaller than the diameter of the region in which the insulating resin impregnated portion 39 is formed, and the disk portion 42a and the insulating resin impregnated portion 39 are bonded to each other. Since the rise amount of the insulating resin 40 from an apparent surface of the anode member 31 can be reduced approximately to zero by controlling the formation conditions of the insulating resin impregnated portion 39, electric connection between the anode member 31 and the lead member 42 is obtained by the bonding. In this instance, preferably the lead member 42 is contacted under pressure with the anode member 31 before the insulating resin 40 becomes hardened so that the insulating resin 40 may be removed from the surface of the anode member 31 in the bonding region to assure the electric connection.

Then, an oxide film 32 is formed on the surface of the anode member 31, for which the lead member 42 is provided, by anodic oxidation in aqueous solution. Upon anodic oxidation, a positive voltage is applied to the anode member 31 by way of the lead member 42. Thereafter, the anode member 31 is, for example, soaked into aqueous solution of manganese (II) nitrate to thermally decompose manganese (II) nitrate sticking to the surface of the anode member 31 to form a solid electrolyte layer 33 made of manganese dioxide on the oxide film 32. When the oxide film 32 is formed and when the solid electrolyte layer 33 is formed, a step of soaking the anode member 31 into aqueous solution is involved. In the present embodiment, since the insulating resin 40 is impregnated, the oxide film 32 or the solid electrolyte layer 33 is formed little in the region in which the insulating resin impregnated portion 39 is formed.

In the chip-formed solid electrolytic capacitor, electrical isolation between the solid electrolyte layer 33 and the anode outer electrode layer 37 is required, and to this end, particularly the solid electrolyte layer 33 must be prevented from being formed in the region in which the insulating resin impregnated portion 39 is formed. From this point of view, the surface of the insulating resin impregnated portion 39 is preferably formed so as to repel water and preferably a water repellent resin is used for the insulating resin 40. Further, since manganese dioxide is deposited by thermal decomposition to form the solid electrolyte layer 33, a resin which can withstand a high temperature upon the thermal decomposition must be used for the insulating resin 40. As an insulating resin which has such heat withstanding property, for example, fluororesins and silicone resins can be used.

Thereafter, except the face on the anode side of the anode member 31, a cathode layer 34 made of graphite is formed, and then, after the face on the cathode side is masked with a rubber pad, the entire surface is coated with an outer packaging resin 38 by powder packaging, soaking or some other suitable means. In this instance, since the lead member 42 remains mounted, also the location at which the lead member 42 is bonded is not coated with the outer packaging resin 38. Then, the mask of the rubber pad is removed, and a plated layer 35a is formed on the exposed face of the cathode layer 34 and the four side faces in the proximity of an end portion of the exposed face. Then, the lead member 42 is removed as seen in FIG. 4C, and a plated layer 35b is formed on the thus exposed face including the insulating resin impregnated portion 39 and the four side faces in the proximity of an end portion of the exposed face in a similar manner to the cathode side. Finally, the anode member 31 is soaked into a solder tank to form a cathode outer electrode layer 36 and an anode outer electrode layer 37 on the plated layers 35a and 35b, respectively.

<<Second Embodiment>>

The material to be used for the solid electrolyte layer 33 is not limited to manganese dioxide, and some other solid electrolytic substance, for example, an organic solid electrolyte, can be used. Here, formation of the solid electrolyte layer 33 using polypyrrole is described.

The method of production up to formation of the oxide film 32 is similar to that of the first embodiment described above. Then, as disclosed in Japanese Patent Laid-Open Application No. Hei-6-69082 (JP, A, 6-69082) by T. Fukami et al., a 20 wt % ethanol solution of iron (III) dodecilbenzenesulfonate which is an oxidizing agent and a 1 mol % aqueous solution of pyrrole are prepared, and the anode member 31 on which the lead member 42 is mounted and the oxide film 32 are formed is alternately soaked into the two solutions to repeat polymerization to form the solid electrolyte layer 33. Thereafter, a cathode layer 34, an outer packaging resin 38 and a plated layer 35a are formed in a similar manner as in the first embodiment, and then, the lead member 42 is removed.

In the present embodiment, while a conductive polymer such as polypyrrole is used, an organic solvent (here, ethanol) is used as a solvent for an oxidizing agent which is used for polymerization of the conductive polymer. Consequently, even if a water repellent resin is used for the insulating resin 40, the solid electrolyte layer 33 is sometimes formed creeping up to the lead member 42 or to a location in the proximity of the lead member 42 to short-circuit the anode member 31 and the solid electrolyte layer 33 to each other. Therefore, in the present embodiment, after the lead member 42 is removed, a heater chip of approximately 300° C. is pressed for about two seconds against the exposed portion of the anode member 31 to change the polypyrrole layer at the location into an insulator. The succeeding steps are all similar to those of the first embodiment. In the second embodiment, by adding the step of partial insulation of the solid electrolyte layer 33, the percent defective by leak current can be reduced to one fifth or less.

With the chip-formed solid electrolytic capacitors according to the embodiments described above, since no anode lead is left, when a chip part of a profile of the so-called 3216 type of 3.2 mm long, 1.6 mm wide and 1.6 mm high is produced, it exhibits an improvement in volume efficiency of the electrostatic capacitance by 20% or more comparing with conventional products.

Further, for each of the chip-formed solid electrolytic capacitors according to the embodiments described above, a temperature cycle test from −55° C. to +125° C. was conducted by 100 cycles, and a tangential (so-called tan δ) measurement for the dielectric loss after each test was conducted. However, the tests showed that there was no deterioration. It is considered that this arises particularly from the fact that the anode outer electrode layer 37 is electrically connected over a great area to the anode member 31 by the plated layer 35b.

While a fluororesin is used for the insulating resin 40 in the embodiments described above, it is used in order to prevent the oxide film 32 or the solid electrolyte layer 33 from being formed on the end face of the anode member 31 on the anode side. However, when various resins other than fluororesins such as, for example, epoxy resins or silicone resins are used, the effects described above are also achieved. A resin which is high in heat withstanding property and superior in water repellent property is preferably employed for the insulating resin 40.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A solid electrolytic capacitor in the form of a chip, comprising a porous anode member made of a valve metal, an oxide film layer formed on the anode member, a cathode layer formed from a conductive material, a solid electrolyte layer held between the oxide film layer and the cathode layer, an anode outer electrode layer disposed on one of a pair of end faces of the anode member, a cathode outer electrode layer disposed on the other end face of the anode member and electrically connected to the cathode layer, and an outer packaging resin layer for covering over a region in which the anode outer electrode layer and the cathode outer electrode layer are not formed to isolate both outer electrode layers from each other, the one of the end faces of the anode member having an insulating resin impregnated portion where an electrically insulating resin is impregnated in the anode member, the anode member and the anode outer electrode layer being electrically connected to each other at the insulating resin impregnated portion.

2. The solid electrolytic capacitor according to claim 1, wherein the anode member and the anode outer electrode layer are connected to each other by way of a plated layer.

3. The solid electrolytic capacitor according to claim 2, wherein the electrically insulating resin is a fluororesin.

4. The solid electrolytic capacitor according to claim 1, wherein the electrically insulating resin is a water repellent resin.

5. The solid electrolytic capacitor according to claim 4, wherein the anode member and the anode outer electrode layer are connected to each other by way of a plated layer.

6. The solid electrolytic capacitor according to claim 5, wherein the cathode layer and the cathode outer electrode layer are connected to each other by way of another plated layer.

7. The solid electrolytic capacitor according to claim 1, wherein the solid electrolyte layer is formed from manganese dioxide.

8. The solid electrolytic capacitor according to claim 1, wherein the solid electrolyte layer is formed from a conductive polymer material.

9. A chip-type solid electrolytic capacitor comprising:

a porous anode member made of a valve metal;

an oxide film layer formed on the anode member;

a cathode layer of conductive material;

a solid electrolyte layer held between the oxide film layer and the cathode layer;

an anode outer electrode layer disposed on a first end face of the anode member;

a cathode outer electrode layer disposed on a second end face of the anode member and electrically connected to the cathode layer;

an outer packaging resin layer formed over a part of said cathode layer not covered by one of the anode outer electrode layer and the cathode outer electrode layer, said outer packaging resin layer isolating said anode and cathode outer electrode layers from each other;

the first end face of the anode member having an insulating resin-impregnated portion where an electrically insulating resin is impregnated in the anode member, the anode member and the anode outer electrode layer being electrically connected to each other via the insulating resin-impregnated portion; said porous anode member being free of implanted anode leads; and said anode outer electrode layer only being disposed over the first end face of said anode member.

* * * * *